(12) United States Patent
Lingala et al.

(10) Patent No.: US 10,492,074 B2
(45) Date of Patent: Nov. 26, 2019

(54) CREDENTIAL SYNCHRONIZATION FOR A MOBILE DEVICE

(71) Applicant: Carrier Corporation, Palm Beach Gardens, FL (US)

(72) Inventors: Ramesh Lingala, Telangana (IN); Amuduri Santhosh, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/944,850

(22) Filed: Apr. 4, 2018

(65) Prior Publication Data

US 2019/0246276 A1  Aug. 8, 2019

(30) Foreign Application Priority Data

Feb. 7, 2018  (IN) .............................. 201811004558

(51) Int. Cl.

| | | |
|---|---|---|
| *H04W 12/08* | (2009.01) | |
| *H04W 12/06* | (2009.01) | |
| *H04L 29/06* | (2006.01) | |
| *H04W 4/02* | (2018.01) | |
| *H04W 56/00* | (2009.01) | |
| *H04W 4/021* | (2018.01) | |
| H04W 88/02 | (2009.01) | |

(52) U.S. Cl.
CPC ........... *H04W 12/08* (2013.01); *H04L 63/107* (2013.01); *H04W 4/021* (2013.01); *H04W 4/025* (2013.01); *H04W 12/06* (2013.01); *H04W 56/001* (2013.01); *H04W 88/02* (2013.01)

(58) Field of Classification Search
CPC ... H04W 12/08; H04W 4/021; H04W 56/001; H04W 4/025; H04W 12/06; H04W 88/02; H04L 63/107
See application file for complete search history.

(56) References Cited

U.S. PATENT DOCUMENTS

| | | | | |
|---|---|---|---|---|
| 6,134,561 A | * | 10/2000 | Brandien | ............... G06Q 10/08 |
| 6,285,916 B1 | * | 9/2001 | Kadaba | .................. G06Q 10/08 700/222 |
| 6,385,541 B1 | | 5/2002 | Blumberg et al. | |
| 6,822,553 B1 | | 11/2004 | Henderson et al. | |
| 7,177,819 B2 | * | 2/2007 | Muncaster | ............. G06Q 50/16 340/5.73 |
| 7,269,433 B2 | | 9/2007 | Vargas et al. | |

(Continued)

FOREIGN PATENT DOCUMENTS

| | | |
|---|---|---|
| CN | 202373035 | 8/2012 |
| CN | 106973090 | 7/2017 |
| WO | 2005109262 | 11/2005 |

*Primary Examiner* — Julio R Perez
(74) *Attorney, Agent, or Firm* — Cantor Colburn LLP (57) ABSTRACT

Methods and systems of credential synchronization for a mobile device include performing one or more of: time-based, location-based, and push notification-based credential synchronization between a credential server and a mobile device. Credential synchronization handles conditions where synchronization is delayed due to communication issues between the credential server and the mobile device. Synchronization can be performed prior to the mobile device reaching a location of an access control to be opened based on a credential provided during credential synchronization.

20 Claims, 6 Drawing Sheets

(56) References Cited

U.S. PATENT DOCUMENTS

| | | | |
|---|---|---|---|
| 7,809,384 B2 | 10/2010 | Vargas et al. | |
| 8,718,612 B2 | 5/2014 | Calman et al. | |
| 8,754,744 B2 | 6/2014 | Woodard et al. | |
| 9,195,814 B1 * | 11/2015 | Vazquez | G06F 21/31 |
| 9,600,949 B2 | 3/2017 | Conrad et al. | |
| 2005/0003801 A1 | 1/2005 | Randall et al. | |
| 2008/0252415 A1 * | 10/2008 | Larson | G07C 9/00309 |
| | | | 340/5.73 |
| 2011/0109433 A1 * | 5/2011 | Kuenzi | G06Q 30/04 |
| | | | 340/5.73 |
| 2012/0077529 A1 | 3/2012 | Kim et al. | |
| 2014/0188614 A1 | 7/2014 | Badenhop | |
| 2016/0292740 A1 | 10/2016 | Akhavan-Saraf et al. | |
| 2017/0187801 A1 | 6/2017 | Lugo | |
| 2017/0311161 A1 * | 10/2017 | Kuenzi | G07C 9/00904 |

\* cited by examiner

CREDENTIAL SYNCHRONIZATION FOR A MOBILE DEVICE

CROSS-REFERENCE TO RELATED APPLICATION

This application claims the benefit of the IN Application No. 201811004558 filed Feb. 7, 2018, which is incorporated herein by reference in its entirety.

BACKGROUND

The present disclosure relates to a lock system with mobile device key access, and more particularly, to credential synchronization for a mobile device.

Traditionally, lock boxes and similar devices are operated manually by a user to gain access to a key that unlocks an independent lock. Such lock boxes require the user to know a combination to gain access to the key. Unfortunately, such lock box use creates a cumbersome process and often scenarios where security may be in question.

An electronically-controlled lock box or other such types of access controls can enhance security by enabling credential updates and/or use more complex credential verification than traditional lock boxes. However, obtaining credentials to interface with an electronically-controlled lock box or access control can present other issues depending on available communication interfaces and the timing of updates.

BRIEF DESCRIPTION

According to an embodiment, an application on a mobile device monitors a current time indicator and issues a synchronization request to a credential server based on detecting that the current time indicator matches an entry in a synchronization schedule. A secondary synchronization sequence is activated based on detecting a communication issue between the mobile device and the credential server after detecting that the current time indicator matches the entry in the synchronization schedule. The secondary synchronization sequence includes monitoring a current location of the mobile device and issuing the synchronization request based on the current location of the mobile device matching a predetermined location. A credential received from the credential server responsive to the synchronization request is stored, where the credential is operable to open an access control.

In addition to one or more of the features described above or below, or as an alternative, further embodiments may include where the secondary synchronization sequence includes periodically issuing the synchronization request at a predetermined interval until the credential is received.

In addition to one or more of the features described above or below, or as an alternative, further embodiments may include where the current location of the mobile device is obtained using coordinates from a positioning system.

In addition to one or more of the features described above or below, or as an alternative, further embodiments may include where the predetermined location includes a geo-fenced location defined in proximity to a wireless access point.

In addition to one or more of the features described above or below, or as an alternative, further embodiments may include where the secondary synchronization sequence further includes monitoring a communication signal strength of the mobile device and issuing the synchronization request based on determining that the communication signal strength is at or above a minimum signal strength threshold.

In addition to one or more of the features described above or below, or as an alternative, further embodiments may include where the synchronization request is issued based on detecting an identifier signal emitted by a remote device at a location.

In addition to one or more of the features described above or below, or as an alternative, further embodiments may include where the synchronization schedule is user configurable, and the method further includes sending one or more entries of the synchronization schedule to the credential server based on detecting a user-made change to the one or more entries and receiving one or more adjustments to the synchronization schedule from the credential server responsive to a load balancing determination by the credential server.

According to another embodiment, a method includes monitoring, by an application on a mobile device, a current location of the mobile device. The mobile device issues a synchronization request to a credential server based on detecting that the current location of the mobile device matches a predetermined location including a geo-fenced location defined in proximity to a wireless access point. A credential received from the credential server responsive to the synchronization request is stored, where the credential is operable to open an access control.

In addition to one or more of the features described above or below, or as an alternative, further embodiments may include where issuing the synchronization request is based on detecting that a current time indicator matches an entry in a synchronization schedule in combination with the current location of the mobile device matching the predetermined location.

In addition to one or more of the features described above or below, or as an alternative, further embodiments may include where the predetermined location is selected from a plurality of predetermined locations based on identifying a closest instance of the predetermined location to the current location of the mobile device.

In addition to one or more of the features described above or below, or as an alternative, further embodiments may include determining a time since the credential was last received and issuing the synchronization request based on determining that the time since the credential was last received exceeds an update interval in combination with the current location of the mobile device matching the predetermined location.

In addition to one or more of the features described above or below, or as an alternative, further embodiments may include where the geo-fenced location is defined with respect to expected signal coverage of one or more instance of the wireless access point.

In addition to one or more of the features described above or below, or as an alternative, further embodiments may include where the access control is located external to an area defined by the geo-fenced location.

In addition to one or more of the features described above or below, or as an alternative, further embodiments may include where the geo-fenced location is selected responsive to a user input.

According to another embodiment, a mobile credential management system includes a processing system and a memory system comprising computer-executable instructions that, when executed by the processing system, cause the processing system to perform a plurality of operations. The operations include monitoring a last synchronization time of a mobile device, sending a push notification of synchronization to the mobile device based on determining that the last synchronization time exceeds a synchronization time limit, receiving a synchronization request from the mobile device responsive to the push notification of synchronization, and sending at least one credential to the mobile device responsive to the synchronization request, the at least one credential operable to open an access control.

In addition to one or more of the features described above or below, or as an alternative, further embodiments may include where sending the push notification of synchronization to the mobile device is further based on determining that the at least one credential has been updated with a change in one or more of: an expiration date and an access right.

In addition to one or more of the features described above or below, or as an alternative, further embodiments may include where sending the push notification of synchronization is scheduled with respect to a plurality of mobile devices to balance loading.

In addition to one or more of the features described above or below, or as an alternative, further embodiments may include where the push notification of synchronization includes one or more adjustments to a synchronization schedule of the mobile device.

In addition to one or more of the features described above or below, or as an alternative, further embodiments may include where the operations further include resetting the last synchronization time based on sending the at least one credential to the mobile device.

In addition to one or more of the features described above or below, or as an alternative, further embodiments may include where the operations further include using an update of the credential to open the access control.

Technical effects of embodiments of the present disclosure include credential synchronization through a mobile device prior to interfacing with an access control.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
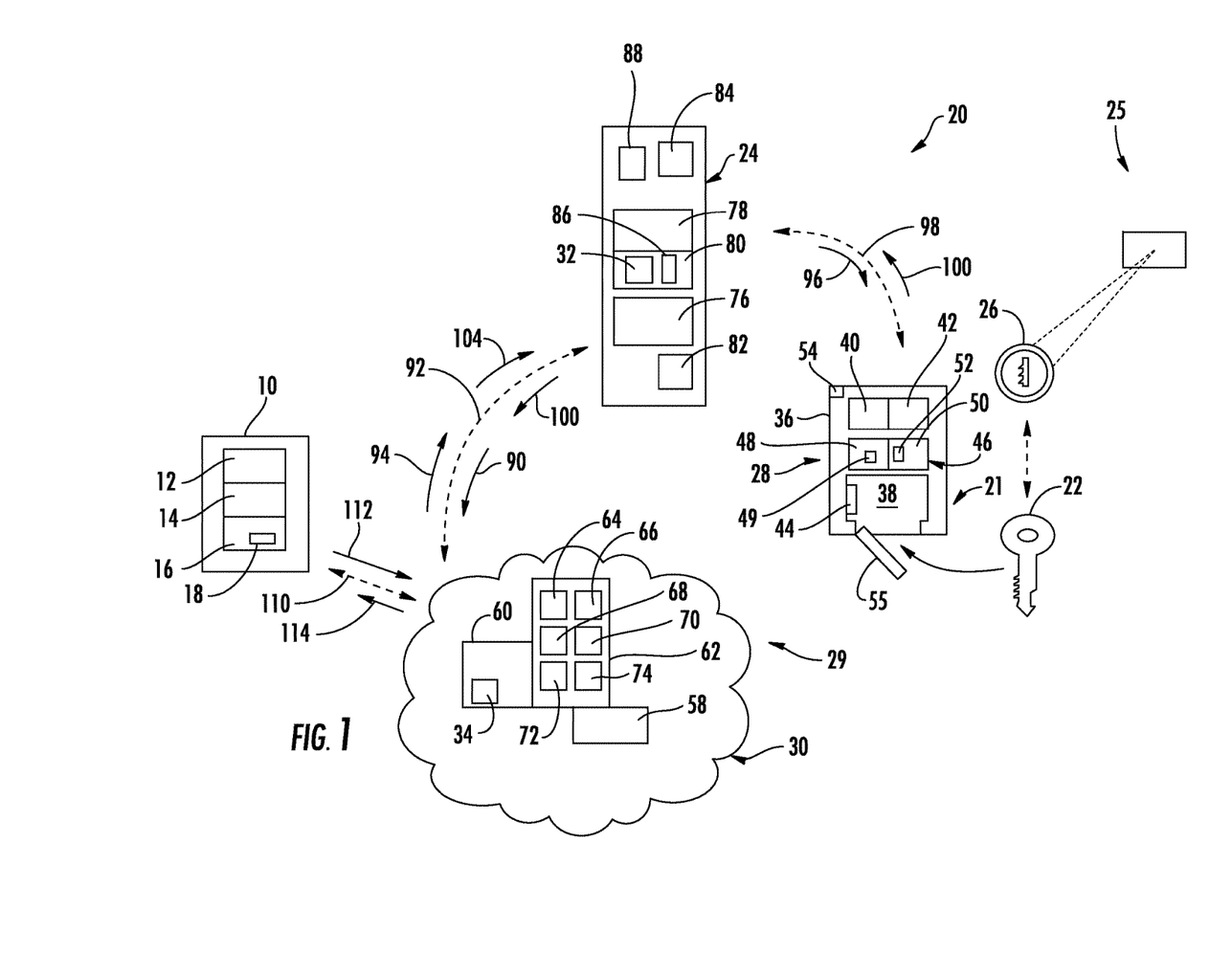
FIG. 1 is a diagram of a system as one, non-limiting, exemplary embodiment of the present disclosure.
Figure 2:
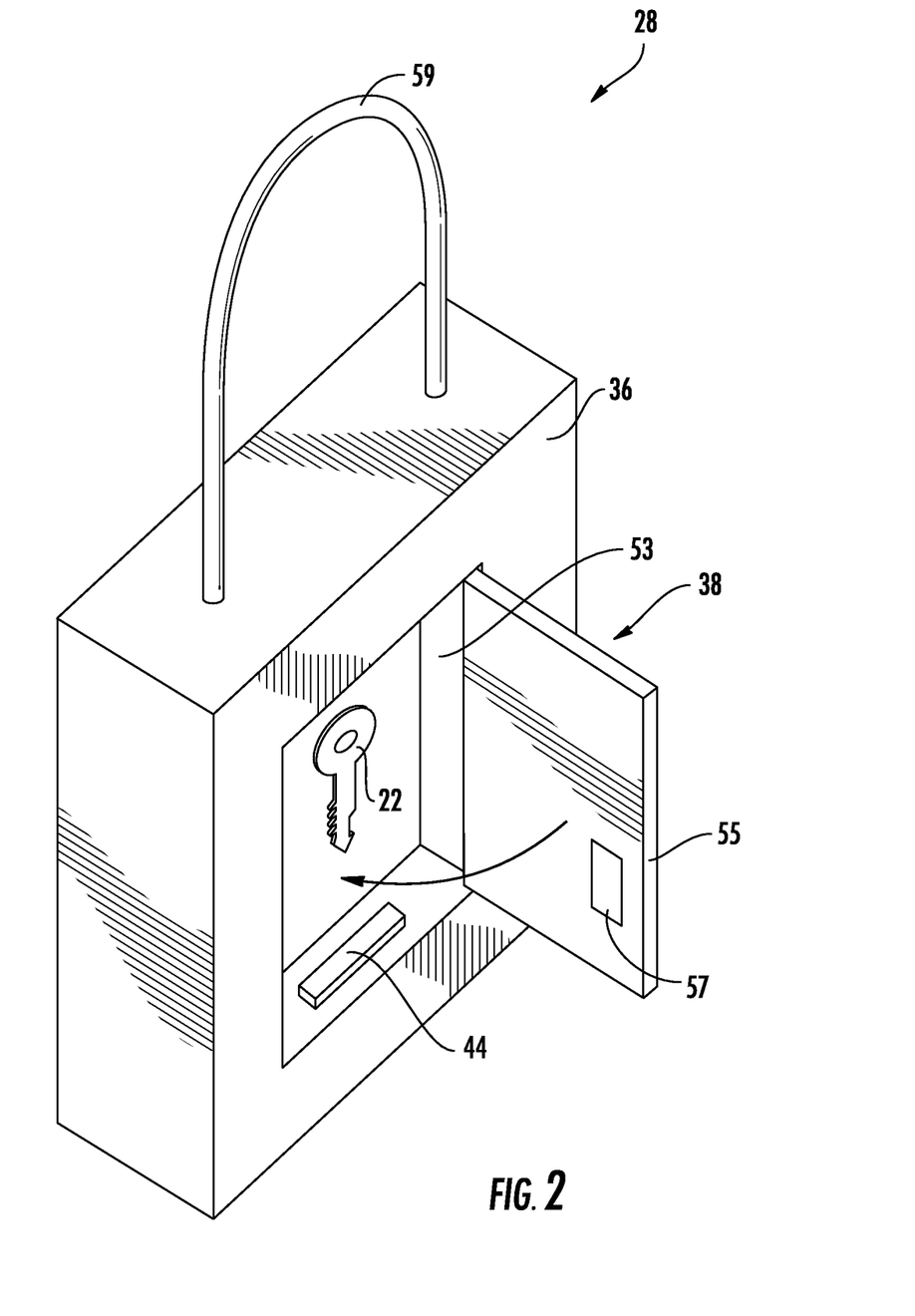
FIG. 2 is a schematic of a key box according to an embodiment.

Referring to FIGS. 1 and 2, an access control system 20 facilitates opening of an access control 21 upon authentication of a credential 96 from a mobile device 24 that may be carried by a user. As one example, the access control 21 provides a controlled release of a key 22. Once released, the key 22 may be used to unlock a more conventional lock 26 (e.g., deadbolt) that may generally be independent of the access control system 20. In one example, the key 22 may be a small piece of shaped metal with incisions cut to fit the wards of a particular lock 26. In other examples, the key 22 may be a card with a magnetic strip and/or a bar code that is detectable and/or readable by the lock 26, or a digital key. The lock 26 may be part of a storage safe, a gate, and/or an access door (not shown). The access door may be a hotel room door, an entry door of a house or business, or other elements that may require locking at an access controlled location 25. Examples of the mobile device 24 may include a smartphone, a tablet computer, a wearable computing device, or any other computing devices with wireless communication capability typically carried or worn by a user.

The access control system 20 may include at least one access control 21, a mobile credential management system 29 including at least one credential server 30 that may be remote and/or cloud-based, and an application 32 that may be software-based and loadable onto the mobile device 24 as a mobile application. The access control 21 may be any type of electronically controlled locking mechanism. In the example of FIGS. 1 and 2, the access control 21 is embodied as a key box 28. The key box 28 may include a casing 36, lockable key repository 38, a receiver 40, a transmitter 42, a key presence device 44, and a controller 46. The controller 46 may include a processor 48 (e.g., microprocessor) and an electronic storage medium 50 that may be computer writeable and readable. The storage medium 50 may store any variety of electronic data including access data or logs, and a credential validation application or module 52 that may be software-based and executable by the processor 48. It is contemplated that the key box 28 may be self-contained, having the needed processing capability within the key box 28 itself, and communicating solely with the mobile device 24 that may possess the required credential 96. Although depicted with a single credential server 30, the mobile credential management system 29 can include one or more processing systems 60 that collectively perform the operations as further described herein.

A user system 10 may be operable to interface with the credential server 30 of the mobile credential management system 29 and can include a user interface 12, a processor 14 (e.g., microprocessor), and an electronic storage medium 16 that may be computer writeable and readable. The storage medium 16 may store an application 18, and the processor 14 may execute the application 18. The application 18 can enable a user, such as a salesperson or other person associated with controlling access to the access controlled location 25, to interface with the mobile credential management system 29 through one or more communication interface 110, including sending requests 112 to and receiving data/notification messages 114 from the mobile credential management system 29. There can be multiple instances of the user system 10, for instance, to support multiple salespeople and/or administrators having security permissions to configure aspects of the key box 28 through the mobile credential management system 29. For example, the user system 10 may control establishing an association or link between key box 28 and the access controlled location 25, receive access notifications indicative of the key box 28 being opened, and access user identified information associated with a user of the mobile device 24 upon creation and/or use of credential 96.

With respect to the key box 28, the lockable key repository 38 may generally include a key compartment 53, an access panel 55, a lockable or releasable latch 57, and a hanger or attachment means 59. The key compartment 53 may include boundaries defined by the casing 36 and the access panel 55. The access panel 55 may be releasably engaged to the casing 36 via the releasable latch 57. Examples of the releasable latch 57 may include any variety of mechanical and/or magnetic devices generally known by those skilled in the art of latches. The engagement and disengagement of the releasable latch 57 may be generally controlled by the controller 46.

In some embodiments, the controller 46 can include a clock 49 that can be used to verify that a credential 96 (e.g., an access code) provided from the mobile device 24 via a wireless communication interface 98 or other interface is presently valid. For example, the credential 96 can be an encoded value that includes an identifier specific to the key box 28 and a valid time range in which the credential 96 can be considered valid for opening the releasable latch 57. As an alternative, the key box 28 may communicate with a processing system 60 of the mobile credential management system 29, which may use a clock 34 to validate that the credential 96 is being used within a valid window of time. In other embodiments, the clock 49 can be omitted. The credential 96 need not be electronically transmitted between the mobile device 24 and the access control 21. In some embodiments, credential 96 is an access code that can be observed by a user of the mobile device 24 and manually input into the access control 21, e.g., through a keypad or other such interface.

Once the key 22 is removed, the processor 48 of the key box 28 may, or may not, output a command that re-latches the access panel 55 closed. Upon the return of the key 22, the key presence device 44 may sense the return of the key 22 as a key return event resulting in closure/re-latching of the access panel 55 to secure the key 22. Examples of a key presence device 44 may include a device capable of sensing the weight of the key 22, or sensing a device (such as a magnet) attached to the key 22. Events such as credential validation and acknowledgement can trigger one or more messages 100 to the mobile device 24 and/or to the mobile credential management system 29, which may be further flowed to the user system 10.

In some embodiments, the key box 28 may be an off-line lock assembly and communications between the credential server 30 and the key box 28 may be conducted through the mobile device 24. The key box 28 may further communicate with the mobile device 24 by way of Near-Field Communications (NFC) or two-way Bluetooth communications with longer range wireless communications being performed by the mobile device 24. Alternatively, it is contemplated and understood that communications may be conducted directly between one or more credential server 30 of the mobile credential management system 29 and the key box 28, for instance, via a transceiver (i.e., receiver 40 and transmitter 42) using NFC, Bluetooth®, cellular, or the like.

In one example, the key box 28 may be one of a plurality of lock boxes capable of communicating to and/or through the mobile device 24, via the application 52, and to the mobile credential management system 29. Each key box 28 may include a key box identifier 54 associated with the key box 28 and/or the access controlled location 25. The key box identifier 54 may be displayed visually on the key box 28, or may be transmitted (i.e., a beacon) by the transmitter 42 of the key box 28 for receipt by the mobile device 24.

In one example, the key box identifier 54 may be formatted as a barcode, QR code, or other code fixed to the key box 28, capable of being scanned, or read, by the mobile device 24. In another example, the key box identifier 54 may be wirelessly communicated to the mobile device 24 and/or the mobile credential management system 29. In yet a further example, the mobile device 24 may identify a key box 28 based on geographic location through use of a geographic positioning application 86 applied by the mobile device 24.

In one embodiment, the lock 26, the key 22, and the key box 28 may be associated with the same key box identifier 54. In another embodiment, the key box identifier 54 of the key box 28 may be temporarily associated with the access controlled location 25 and the key 22 that works with the access controlled location 25. In this example, the mobile credential management system 29, or the controller 46 of the key box 28 may be programmed to at least temporarily associate the key box identifier 54 to the access controlled location 25 and the key 22 until removed from inventory, e.g., due to a sale of an asset at the access controlled location 25.

The credential server 30 may include a transceiver 58 for wireless communications, processing system 60 (e.g., one or more microprocessors), and a memory system including an electronic storage medium 62 that may be computer writeable and readable. In one embodiment, the credential server 30 may be configured to correlate the key box identifier 54 of the key box 28 to the access controlled location 25 of the lock 26, which utilizes the key box 28. More specifically, and in one example, the key box 28 may be temporarily secured at the access controlled location 25. The key 22 can be a key typically used to lock, unlock, and/or activate/deactivate an asset at the access controlled location 25.

The electronic storage medium 62 may store any variety of modules that may be software based and executable by the processing system 60. For example, the modules may include a credentialing module 64, a monitoring module 66, a validation module 68, a correlation module 70, a third party alert, or administration, module 72, an access monitor module 74, and/or other modules. The credentialing module 64 may be configured to issue one or more credential 96 to the mobile device 24 responsive to a synchronization request. The monitoring module 66 may track a last synchronization time of the mobile device 24 and send a push notification of synchronization to the mobile device 24 based on determining that the last synchronization time exceeds a synchronization time limit. The validation module 68 may confirm the validity of a credential 96 and may support revocation of the credential 96 responsive to an administrative request through the administration module 72. The correlation module 70 may be used to correlate the key box identifier 54 of the key box 28 to the access controlled location 25 that may be temporarily assigned to the key box 28. That is, the correlation module 70 may apply a programmable, cross-referencing, data table. The administration module 72 may enable configuration of functions, access to underlying data, and other such capability for administrator access through user system 10. The access monitor module 74 may apply a real-time update of when the key 22 is being utilized. For example, when the credential 96 is used to open the key box 28, the access monitor module 74 may notify the mobile credential management system 29, which may notify the user system 10 about the access event along with information associated with a user of a mobile device 24. The access monitor module 74 may also track attempted invalid accesses to the key box 28. It is contemplated and understood that any number of the modules 64, 66, 68, 70, 72, 74 may be stored and executed by the controller 46 of the key box 28, or as part of the application 32 of the mobile device 24. It is further contemplated that any number of the modules 64, 66, 68, 70, 72, 74, together, may comprise an executable application (i.e., a computer software product). One or more of the modules 64, 66, 68, 70, 72, 74 can be omitted, combined, or further subdivided.

In embodiments, a single credential 96 may be used to open several access controls 21. In another embodiment, a separate credential 96 is downloaded for each access control 21 that the user of the mobile device 24 is permitted to access. When the mobile device 24 sends a synchronization request 90, the credentialing module 64 determines all of the access controls 21 that the user has permission to access and then generates the needed credentials 96 based upon those permissions. The mobile device 24 can store many credentials 96 in memory.

The mobile device 24 may include a user interface 76, a processor 78 (e.g., microprocessor), an electronic storage medium 80 that may be computer writeable and readable, a scanning device or camera 82, a transceiver 84, and a clock 88. The storage medium 80 may store the application 32 and the processor 78 may execute the application. The application 32 may be configured to identify the specific key box 28 that may be accessible amongst a plurality of key boxes. In one example, the mobile device 24 may be configured to visually read the key box identifier 54 as a bar code using the camera 82 of the mobile device 24. In another embodiment, the mobile device 24 may be configured to receive the key box identifier 54 as a wireless signal or short range communication via the transceiver 84. In yet a further example, the application 32 may apply a geographic positioning module 86 of the mobile device 24, at least in-part stored in the storage medium 80 and executed by the processor 78, to generally determine a current location of the mobile device 24. The clock 88 can be used to determine when to issue a synchronization request to the credential server 30 to fetch/refresh the credential 96 based on a synchronization schedule and/or synchronization retry interval.

In the embodiment where the key box identifier 54 of the key box 28 is accessible via short range communication (e.g., a Bluetooth signal), the mobile device 24 may be programmed with compatible software (i.e., the application 32). In one example, the key box 28, or controller 46, may include a Bluetooth device capable of transmitting the key box identifier 54. The transceiver (i.e., receiver 40 and transmitter 42) may be of a type to support Bluetooth® communications. Further, the key box identifier 54 may be continually broadcast from the key box 28, and may be received by the mobile device 24 without the key box 28 knowing or recognizing that a mobile device 24 is nearby.

In an embodiment that applies the geographic positioning module 86 of the mobile device 24, the geographic positioning module 86 may be configured to determine positioning information indicative of a geographical position using one or more positioning systems or protocols of a type well known in the art, such as Global Positioning Systems (GPS), Global Navigation System (GLONASS), Global Navigation Satellite System (GNSS), Galileo, Long Range Navigation (LORAN), National Marine Electronics Association (NMEA), Trimble Standard Interface Protocol (TSIP), DELORME® EARTHMATE®, Rockwell PLGR Protocol, iBeacon®, and SIRF®, to name a few non-limiting examples. It will also be appreciated that the geographic positioning module 86 may include local, regional, or site-wide systems of a type well known in the art, such as radio frequency identification (RFID), infrared (IR), sensor networks, Wi-Fi-based positioning, and Ultra-Wideband (UWB) positioning systems, to name a few non-limiting examples. The geographic positioning module 86 may work in conjunction with the application 52 of the key box 28. The geographic positioning module 86 may be a Global Positioning System (GPS) receiver circuit, or circuitry associated with other satellite navigation systems. In any case, the geographic positioning module 86 and application 52 can function to determine the position of the mobile device 24 relative to a known placement of the key box 28 at the access controlled location 25. It will also be appreciated that the positioning information may include types well known in the arts such as, geographic latitude and longitude, Universal Transverse Mercator (UTM) and Universal Polar Stereographic (UPS) coordinates, stereographic coordinates, geodetic height, Cartesian coordinates, and site address, to name a few non-limiting examples.

Operation of the access control system 20 will now be described using a real estate application example, wherein each access controlled location 25 available for sale may have a respective key box 28. The correlation module 70 may be used to preprogram each key box 28 to a particular instance of an access controlled location 25. Some access controlled locations 25 may be in remote/rural areas where cell service is marginal or unavailable. As such, a user of the mobile device 24 may need to acquire an updated or valid form of the credential 96 prior to reaching the access controlled location 25. Further, the user of the mobile device 24 may reside in an area with marginal cell coverage and the mobile device 24 may be depowered or otherwise unable to receive the credential 96 as soon as the credential 96 is created or updated by the credentialing module 64. A user of the mobile device 24 may desire to enter the access controlled location 25 but may not be aware of the current status of the credential 96 needed to open the access control 21. Rather than relying upon the user of the mobile device 24 to request the credential 96 directly, embodiments proactively seek to acquire and/or update the credential 96 prior to the user of the mobile device 24 reaching the access controlled location 25. The mobile device 24 may issue a synchronization request 90 over a communication interface 92 to the credential server 30 based on a time value, a location value, or responsive to a push notification 94 from the mobile credential management system 29. The credential server 30 may apply the credentialing module 64 to determine a credential 96 operable to open the releasable latch 57. The validation module 68 may append additional information to the credential 96, such as a necessary code or permission to communicate with, and operate, the key box 28 and credential expiration dates. The credential 96 can include data elements indicating permitted access (e.g., location 25 or key box identifier 54, etc.) and can also include data elements indicating date/time based validity. The credential 96 can also include data elements used for authentication and verification by the key box 28, such as a checksum or digital signature. The credential server 30 can send the credential 96 to the mobile device 24 for later use at the access controlled location 25.

When the mobile device 24 is proximate to the key box 28, the mobile device 24 may output a retrieve key signal over a communication interface 98 to the key box 28. The retrieve key signal may contain the credential 96 with assigned validation information initially provided by the credential server 30. The validation application 52 of the key box 28 may validate the credential 96, then unlatch the key repository 38.

The user of the mobile device 24 may then remove the key 22 from the key box 28. Upon removal, or upon unlatching of the key repository 38, a releasable latch opened indicator may be sent from the key box 28 indicative of the key box 28 acknowledging the credential 96 and providing access to the key 22. The credential server 30 can receive the releasable latch opened indicator as one of the messages 100 and in response thereto, send a notification to user system 10 that identifies the access controlled location 25 and information about a user of the mobile device 24. In embodiments where communication is limited between the access control 21 and the credential server 30, accesses can be logged by the access control 21 for later transfer to the credential server 30 if desired, or sent to the mobile device 24 which later uploads the information to the credential server 30.

The user of the mobile device 24 can apply the key 22 to the lock 26 to gain entry to the access controlled location 25. When the user of the mobile device 24 returns the key 22 to the key repository 38, the key presence device 44 may detect the return of the key 22. Upon return of the key 22, the processor 48 of the key box 28 may generate a notification in a message 100 that can be sent to the credential server 30 via the mobile device 24 or directly. The credential server 30 may then relay the event to the user system 10. An acknowledgement of the key return may be sent from the credential server 30 to the mobile device 24, and the acknowledgement can be displayed on the user interface 76. Yet further, the administration module 72 may be applied by the credential server 30 upon user departure to arrange an inspection of the access controlled location 25 or to schedule a follow-up contact with the user of the mobile device 24.

Figure 3:
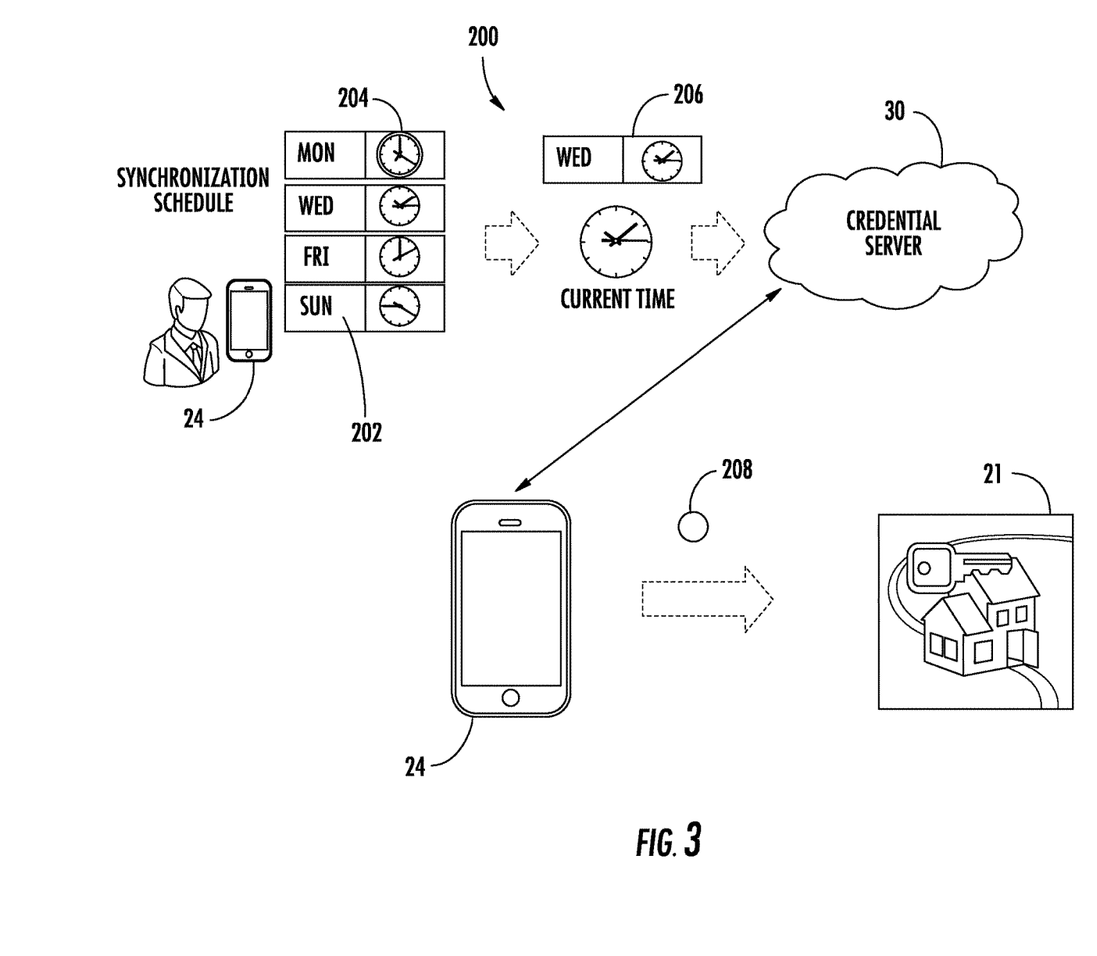
FIG. 3 is a process flow diagram of time-based credential synchronization according to an embodiment.

FIG. 3 depicts an example of a process flow diagram 200 of time-based credential synchronization according to an embodiment. A synchronization schedule 202 is accessed by mobile device 24. The synchronization schedule 202 can include one or more entries 204 that may include a day of the week and a time of day to issue a synchronization request 90 for one or more credentials 96 from the credential server 30. The synchronization schedule 202 can be user configurable. In some embodiments, the credential server 30 can inspect and suggest changes or alter the entries 204 in the synchronization schedule 202. For instance, the mobile device 24 can send one or more entries 204 of the synchronization schedule 202 to the credential server 30 based on detecting a user-made change to the one or more entries 204, and the mobile device 24 can receive one or more adjustments to the synchronization schedule 202 from the credential server 30 responsive to a load balancing determination by the credential server 30. Load balancing may be performed to ensure that a large number of synchronization requests 90 are not all received at the same time. As such groups of synchronization requests 90 can be staggered in time (e.g., shifted by a few minutes) to reduce adverse impacts to the credential server 30 and network bandwidth, if desired.

The mobile device 24 monitors a current time indicator 206, for instance, using the clock 88 of FIG. 1. The mobile device 24 issues a synchronization request 90 to a credential server 30 based on detecting that the current time indicator 206 matches an entry 204 in the synchronization schedule 202. The credential 96 is received from the credential server 30 responsive to the synchronization request 90, where the credential 96 is operable to open an access control 21.

In some embodiments, a secondary synchronization sequence can be activated based on detecting a communication issue between the mobile device 24 and the credential server 30 after detecting that the current time indicator 206 matches the entry 204 in the synchronization schedule 202 (e.g., no cell or Wi-Fi access available). The secondary synchronization sequence can include periodically issuing the synchronization request 90 at a predetermined interval until the credential 96 is received. Further, the secondary synchronization sequence can include monitoring a current location of the mobile device 24 and issuing the synchronization request 90 based on the current location of the mobile device 24 matching a predetermined location. The predetermined location can be a geo-fenced location defined in proximity to a wireless access point, as further described in reference to FIG. 4. The secondary synchronization sequence can also or alternatively include monitoring communication signal strength of the mobile device 24 (e.g., Wi-Fi or cellular signal strength), and issuing the synchronization request 90 based on determining that the communication signal strength is at or above a minimum signal strength threshold. As a further option, a nearby Bluetooth Low Energy (BTLE) signal emitted by a remote device 208 as an identifier signal in a fixed location can be identified by the mobile device 24 to initiate a synchronization request 90. As a further example, rather than a BTLE signal, the remote device 208 may emit a wireless hot-spot ID as an identifier signal that is detected when en-route to a location may trigger a cellular synchronization by the mobile device 24.

Figure 4:
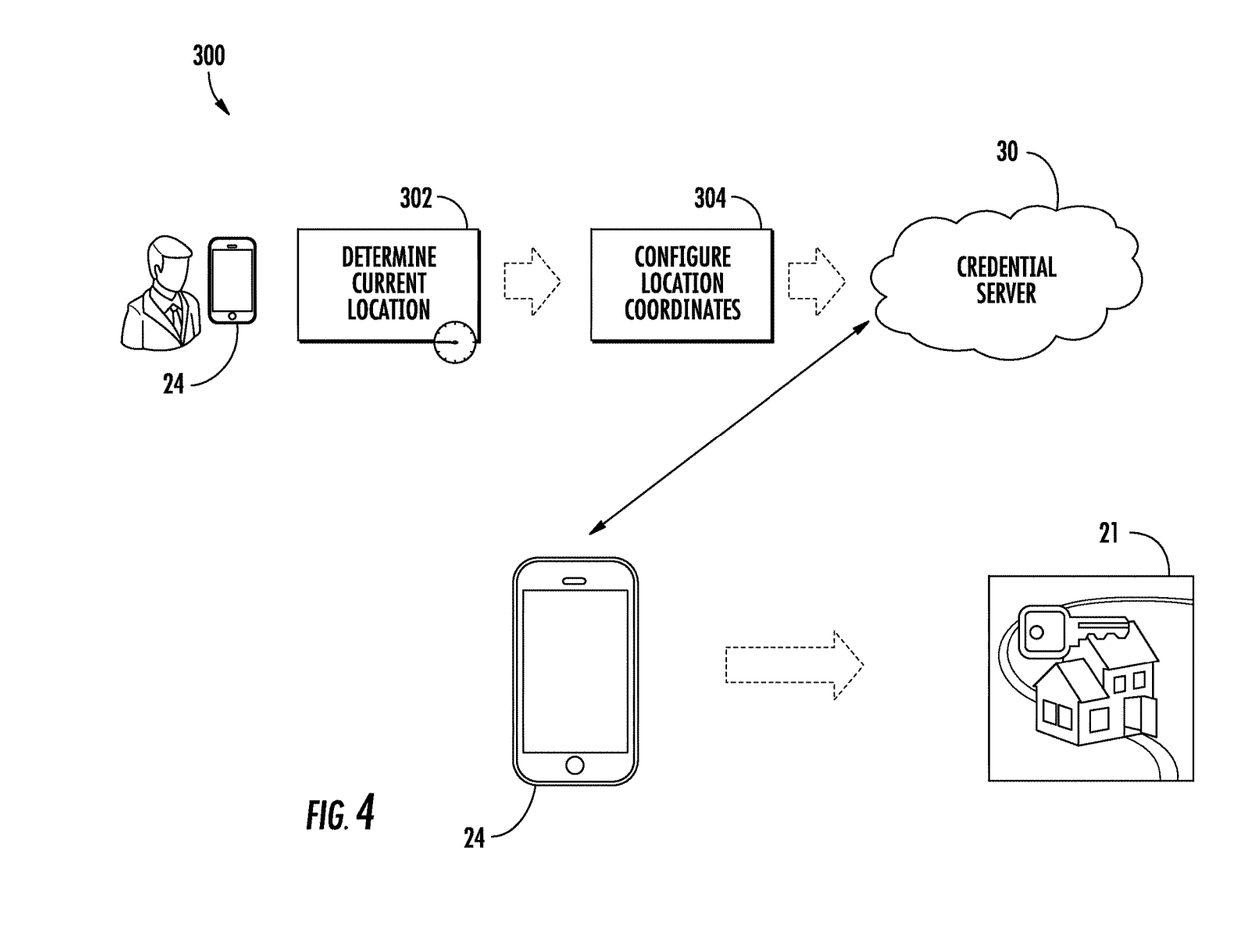
FIG. 4 is a process flow diagram of location-based credential synchronization according to an embodiment.
Figure 5:
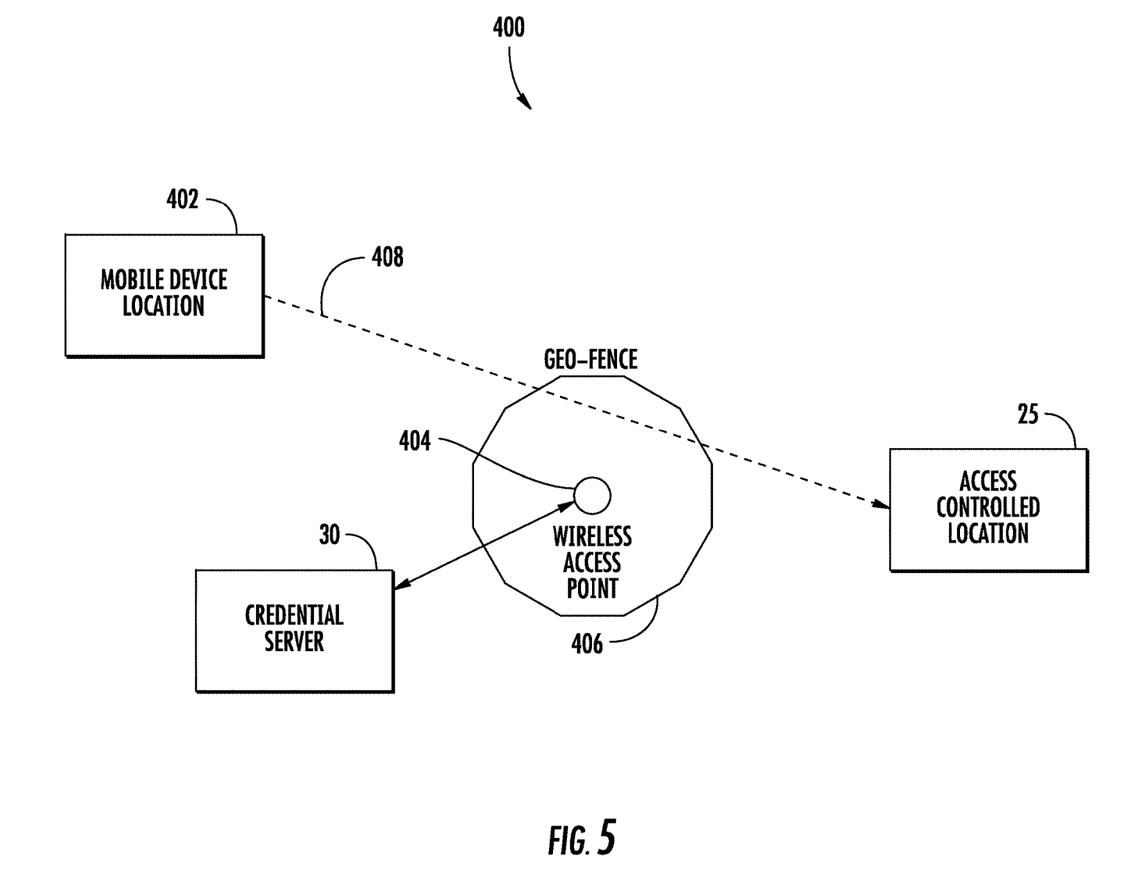
FIG. 5 is a diagram of relative locations for location-based credential synchronization according to an embodiment.

FIG. 4 depicts an example of a process flow diagram 300 of location-based credential synchronization according to an embodiment. The mobile device 24 can monitor for and determine a current location 302 of the mobile device 24 as mobile device location 402 of FIG. 5. The mobile device 24 can issue a synchronization request 90 to a credential server 30 based on detecting that the current location 402 of the mobile device 24 matches a predetermined location comprising a geo-fenced location 404 (FIG. 5) defined in proximity to a wireless access point 406 (FIG. 5). The user of the mobile device 24 can configure location coordinates 304 that define the geo-fenced location 404, e.g., as one or more areas selected responsive to a user input. The geo-fenced location 404 can be defined with respect to expected signal coverage of one or more instance of the wireless access point 406 (which can support Wi-Fi, cellular, or another type of wireless format). The access control 21 can be located external to an area defined by the geo-fenced location 404 as depicted in the example of FIG. 5. For example, as depicted in FIG. 5, the user or an application program may select the geo-fenced location 404 along a planned route 408 between the mobile device location 402 and the access controlled location 25.

A credential 96 received from the credential server 30 responsive to the synchronization request 90 can be stored locally to the mobile device 24. Issuing the synchronization request 90 can be based on detecting that a current time indicator 206 matches an entry 204 in a synchronization schedule 202 in combination with the current location of the mobile device 24 matching a predetermined location. The predetermined location can be selected from a plurality of predetermined locations based on identifying a closest instance of the predetermined location to the current location of the mobile device 24. In some embodiments, the mobile device 24 can determine a time since the credential 96 was last received and issue the synchronization request 90 based on determining that the time since the credential 96 was last received exceeds an update interval in combination with the current location of the mobile device 24 matching the predetermined location.

Figure 6:
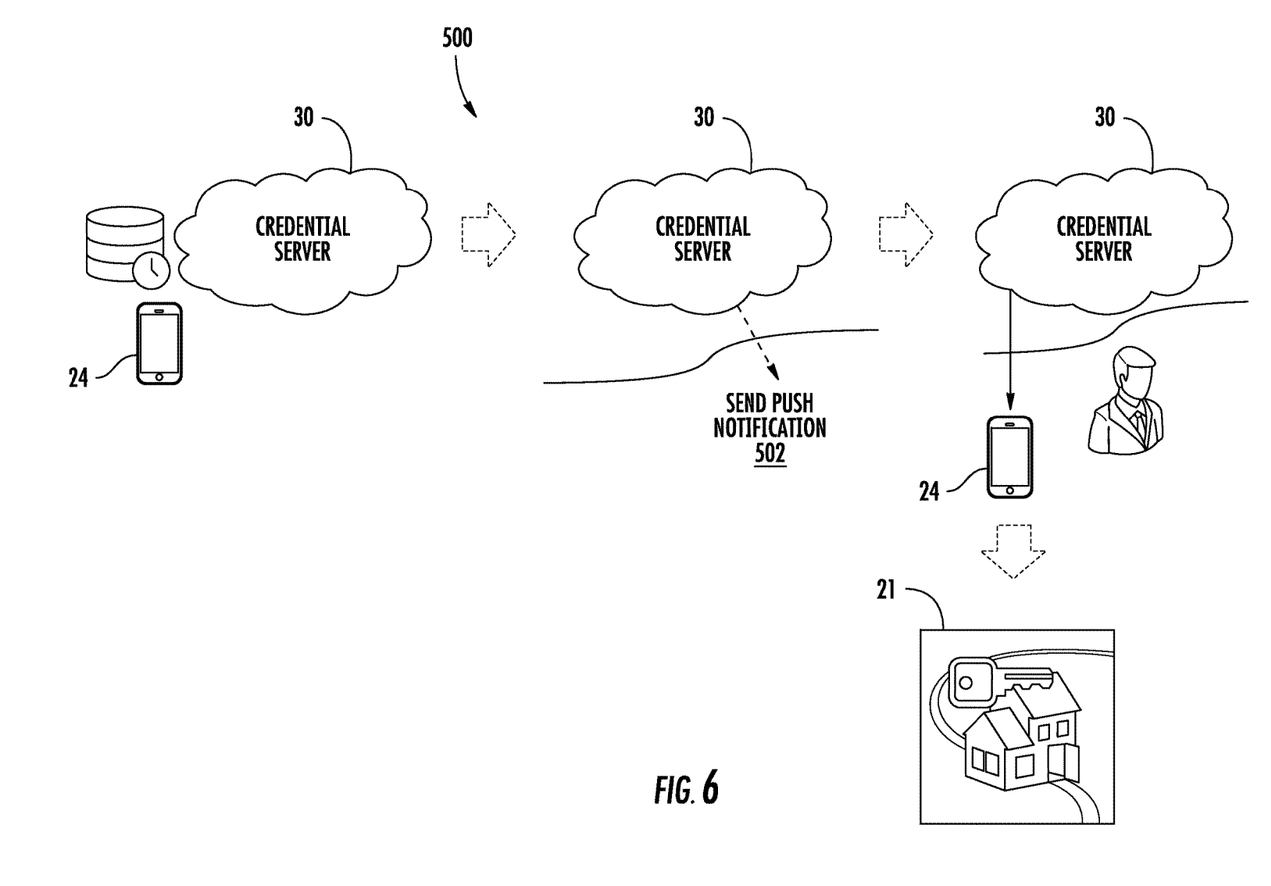
FIG. 6 is a process flow diagram of push-notification based credential synchronization according to an embodiment.

FIG. 6 depicts a process flow diagram 500 of push-notification based credential synchronization according to an embodiment. The processing system 60 in a credential server 30 of the mobile credential management system 29 can be operable to monitor a last synchronization time of the mobile device 24. A push notification 94 of synchronization can be sent to the mobile device 24 based on determining that the last synchronization time exceeds a synchronization time limit. A synchronization request 90 can be received from the mobile device 24 responsive to the push notification 94 of synchronization. A credential 96 can be send to the mobile device 24 responsive to the synchronization request 90 to open an access control 21. Sending the push notification 94 of synchronization to the mobile device 24 can be based on determining that the credential 96 has been updated with a change in one or more of: an expiration date and an access right. Further, sending the push notification 94 of synchronization can be scheduled with respect to a plurality of mobile devices 24 to balance loading. The push notification 94 of synchronization can include one or more adjustments to a synchronization schedule 202 of the mobile device 24. The last synchronization time can be reset based on sending the credential 96 to the mobile device 24. The credential server 30 can send an update of the credential 96 to the access control 21 on an event or scheduled basis.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
    monitoring, by an application on a mobile device, a current time indicator;
    issuing, by the mobile device, a synchronization request to a credential server based on detecting that the current time indicator matches an entry in a synchronization schedule;
    activating a secondary synchronization sequence based on detecting a communication issue between the mobile device and the credential server after detecting that the current time indicator matches the entry in the synchronization schedule, the secondary synchronization sequence comprising monitoring a current location of the mobile device and issuing the synchronization request based on the current location of the mobile device matching a predetermined location; and
    storing a credential received from the credential server responsive to the synchronization request, the credential operable to open an access control.

2. The method set forth in claim 1, wherein the secondary synchronization sequence comprises periodically issuing the synchronization request at a predetermined interval until the credential is received.

3. The method set forth in claim 1, wherein the current location of the mobile device is obtained using coordinates from a positioning system.

4. The method set forth in claim 1, wherein the predetermined location comprises a geo-fenced location defined in proximity to a wireless access point.

5. The method set forth in claim 1, wherein the secondary synchronization sequence further comprises:
    monitoring a communication signal strength of the mobile device; and
    issuing the synchronization request based on determining that the communication signal strength is at or above a minimum signal strength threshold.

6. The method set forth in claim 1, wherein the synchronization request is issued based on detecting an identifier signal emitted by a remote device at a location.

7. The method set forth in claim 1, wherein the synchronization schedule is user configurable, and the method further comprises:
    sending one or more entries of the synchronization schedule to the credential server based on detecting a user-made change to the one or more entries; and
    receiving one or more adjustments to the synchronization schedule from the credential server responsive to a load balancing determination by the credential server.

8. A method comprising:
monitoring, by an application on a mobile device, a current location of the mobile device;
issuing, by the mobile device, a synchronization request to a credential server based on detecting that the current location of the mobile device matches a predetermined location comprising a geo-fenced location defined in proximity to a wireless access point; and
storing a credential received from the credential server responsive to the synchronization request, the credential operable to open an access control.

9. The method set forth in claim 8, wherein issuing the synchronization request is based on detecting that a current time indicator matches an entry in a synchronization schedule in combination with the current location of the mobile device matching the predetermined location.

10. The method set forth in claim 8, wherein the predetermined location is selected from a plurality of predetermined locations based on identifying a closest instance of the predetermined location to the current location of the mobile device.

11. The method set forth in claim 8, further comprising:
determining a time since the credential was last received; and
issuing the synchronization request based on determining that the time since the credential was last received exceeds an update interval in combination with the current location of the mobile device matching the predetermined location.

12. The method set forth in claim 8, wherein the geo-fenced location is defined with respect to expected signal coverage of one or more instance of the wireless access point.

13. The method set forth in claim 8, wherein the access control is located external to an area defined by the geo-fenced location.

14. The method set forth in claim 8, wherein the geo-fenced location is selected responsive to a user input.

15. A mobile credential management system comprising:
a processing system; and
a memory system comprising computer-executable instructions that, when executed by the processing system, cause the processing system to perform a plurality of operations, the operations comprising:
monitoring a last synchronization time of a mobile device;
sending a push notification of synchronization to the mobile device based on determining that the last synchronization time exceeds a synchronization time limit;
receiving a synchronization request from the mobile device responsive to the push notification of synchronization; and
sending at least one credential to the mobile device responsive to the synchronization request, the at least one credential operable to open an access control.

16. The mobile credential management system set forth in claim 15, wherein sending the push notification of synchronization to the mobile device is further based on determining that the at least one credential has been updated with a change in one or more of: an expiration date and an access right.

17. The mobile credential management system set forth in claim 15, wherein sending the push notification of synchronization is scheduled with respect to a plurality of mobile devices to balance loading.

18. The mobile credential management system set forth in claim 15, wherein the push notification of synchronization includes one or more adjustments to a synchronization schedule of the mobile device.

19. The mobile credential management system in claim 15, wherein the operations further comprise:
resetting the last synchronization time based on sending the at least one credential to the mobile device.

20. The mobile credential management system set forth in claim 15, wherein the operations further comprise:
using an update of the credential to open the access control.

* * * * *